April 16, 1968        R. TOBEY        3,378,766
TIME MEASURING CIRCUIT FOR DETERMINING PROJECTILE VELOCITY
Filed March 17, 1965        2 Sheets-Sheet 1
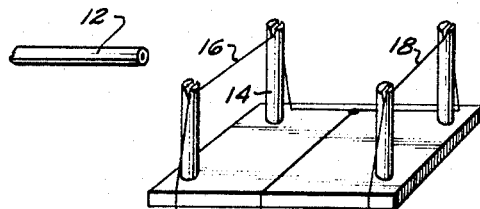
FIG. 1
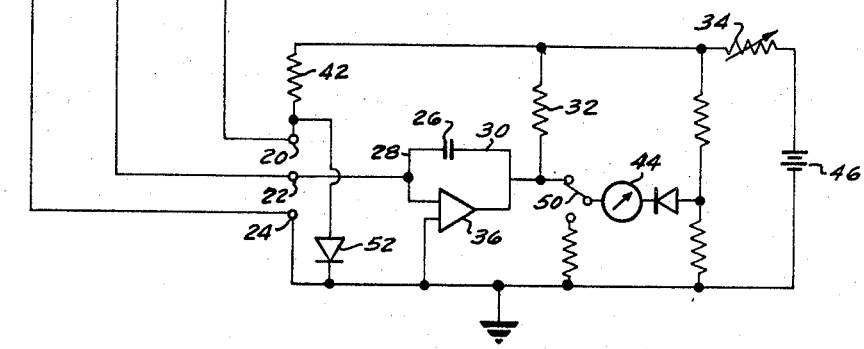
FIG. 3      FIG. 4      FIG. 5
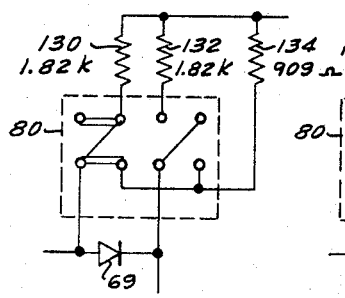 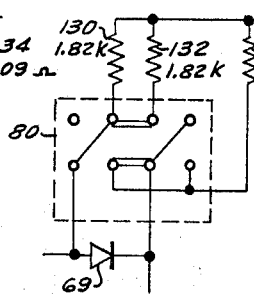 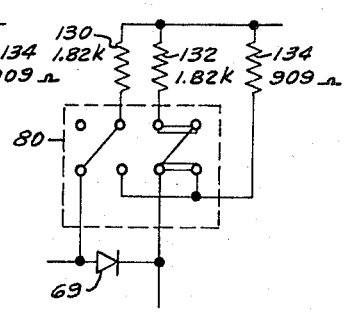
RICHARD TOBEY,
INVENTOR.
BY Albert Rosen
Leon D. Rosen
ATTORNEYS

United States Patent Office 3,378,766
Patented Apr. 16, 1968

3,378,766
A TIME MEASURING CIRCUIT FOR DETERMINING PROJECTILE VELOCITY
Richard Tobey, 1124 N. Mayfair,
Anaheim, Calif. 92801
Filed Mar. 17, 1965, Ser. No. 440,499
7 Claims. (Cl. 324—68)

ABSTRACT OF THE DISCLOSURE

A circuit for measuring the speed of bullets wherein a gun is aimed at two wires spaced a foot apart and a measurement is made of the time elapsed between the breaking of the first and second wires by the bullet. The timing circuit is of the type which measures the amount by which a capacitor is discharged between wire breaks.

---

This invention relates to measuring devices and, while not limited thereby, relates particularly to devices for indicating the speed of projectiles by measuring the time required for them to travel a predetermined distance.

It is often necessary to measure the speed of projectiles in the development and testing of guns and cartridges. For example, riflemen often wish to determine the change in the bullet muzzle velocity caused by various changes in the amount or kind of gunpowder or the configuration of the cartridge case. In many applications, particularly those involving hobbyists, a precision of the order of several percent is acceptable. However, it is important that the velocity measuring device be simply operable, reliable, and economical.

Devices are available for measuring projectile velocity, which, however, do not fulfill the requirements of many users. Typical of such devices is one than consists of a digital counting circuit which begins counting time intervals of perhaps 5 microseconds each, when a projectile passes a first point, and ceases to count when the projectile passes a second point, preferably spaced no more than several feet from the first. The rapid counting is accomplished electronically by transistorized flip-flop switches. Many flip-flop circuits are required in order to count to perhaps one hundred or more time divisions, which is necessary to achieve accuracy, and the circuits must be capable of operation at a high frequency. The output is indicated by the states of the flip-flops, as by causing them to energize neon bulbs. The necessity for many flip-flops, each often requiring two transistors and other circuit components, results in an instrument of high cost. The output indicated by neon bulbs is a measure of time in the binary number system, which the average person must convert to the decimal system to understand. Furthermore, speed is inversely proportional to time, so the distance between the spaced sensors must be divided by the intervals of recorded time to determine velocity. The high cost of the available instruments and the computations required to convert instrument readings into velocity measurements are very serious difficiencies in velocity meters available heretofore.

Accordingly, one object of the present invention is to provide an instrument for measuring the velocity of projectiles, which is simple, reliable, and economical.

Another object is to provide a simple and reasonably accurate instrument for measuring the velocity of projectiles which provides direct velocity readings.

Yet another object is to provide an analog timing circuit which utilizes a minimum number of components to provide accurate timing.

The foregoing and other objects are realized by an instrument which, in elementary terms, can be described as comprising a capacitor connected across an amplifier, and including a first wire for connecting one side of the capacitor to ground and a second wire for connecting the same side of the capacitor to a potential of several volts through a resistor. The wires are spaced a small distance apart such as one foot and a gun whose bullet muzzle velocity is to be measured is aimed at the two wires to cut them in succession. When the instrument is turned on prior to firing the gun, one side of the capacitor is grounded while the other side is charged to several volts. When the gun is fired, the bullet breaks the first wire which was grounding one side of the capacitor, and the capacitor begins to discharge. When the bullet breaks the second wire, the capacitor ceases to discharge. A meter measures the voltage of the partially discharged capacitor to measure the period of time between the breaking of the first and second wires. The scale of the meter is calibrated in velocity, with markings such as feet per second, so that the projectile velocity can be read directly.

In the velocity measuring instruments of this invention, the voltmeter or milliammeter essentially measures the voltage across a capacitor. In a normal situation this would be extremely difficult to do since the current of tens of microamperes required to move the meter needle would discharge a capacitor of reasonable size in a fraction of a second. In this invention an amplifier of very high gain is connected across the capacitor to supply the meter current without quickly discharging the capacitor, so that the capacitor remains at the same voltage for many seconds while the meter is read.

In order to achieve a very high gain, the amplifier which is connected across the timing capacitor is constructed of many stages. Under direct current conditions, which prevail when the meter is read, the multi-stage amplifier is stable. However, under the transient conditions prevailing during the short timing period when the capacitor partially discharges, the cumulative phase shifts of several amplifier stages can lead to positive feedback and oscillations which prevent accurate measurement. In order to prevent such disruptions, only the last stages of amplification are utilized during the timing period when the capacitor partially discharges, this being accomplished by employing high frequency bypass around the first stages of amplification. The timing period lasts for perhaps a millisecond, which is short enough that even the lower gain of only the last stages of the amplifier prevent appreciable discharge of the capacitor through the meter, and accurate results are obtained.

The circuitry of the present invention is simplified by the use of a transistor and diode which define two voltage clamping levels at the break wires. A voltage supply point is connected to ground through three means: a diode with a threshold of 0.7 volt, the base of one amplifier transistor with a threshold of 0.3 volt, and a first wire conductor. Before the first wire conductor is broken, the voltage supply point is at zero volt and the transistor is off. When the wire conductor is broken by the bullet, the voltage of the voltage supply point rises to approximately 0.3 volt, the transistor conducts, and the timing period and the partial discharge of the capacitor begin. When the bullet breaks another wire which isolates the voltage supply point from the transistor, the voltage point raises to 0.7 volt, at which level the diode conducts. Thus, a single battery, and all the circuit simplifications resulting therefrom, can be used to completely energize the circuit in all of its periods of operation.

Further simplification of the circuitry of the present invention is achieved by an arrangement which enables the use of the speed indicating meter to calibrate the instrument before use, to assure accuracy in spite of voltage source variations.

The accuracy of the present velocity measuring instrument is increased by providing several ranges of operation for the different ranges of speed of the projectiles. During the initial stages of capacitor discharge, the amount of discharge is small and unpredictable, and a velocity indication is likely to be inaccurate. Accordingly, means are provided to prevent any meter reading when the projectile speed is too high to measure accurately at the range at which the meter is set.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a simplified block diagram of an instrument constructed in accordance with the invention;

FIGURE 3 is a partial diagram of a range switch connected for enabling the measuring of high speed projectiles;

FIGURE 4 is a partial diagram of a range switch connected for enabling the measuring of medium speed projectiles; and FIGURE 5 is a partial diagram of a range switch connected for enabling the measuring of low speed projectiles.

Figure 2:
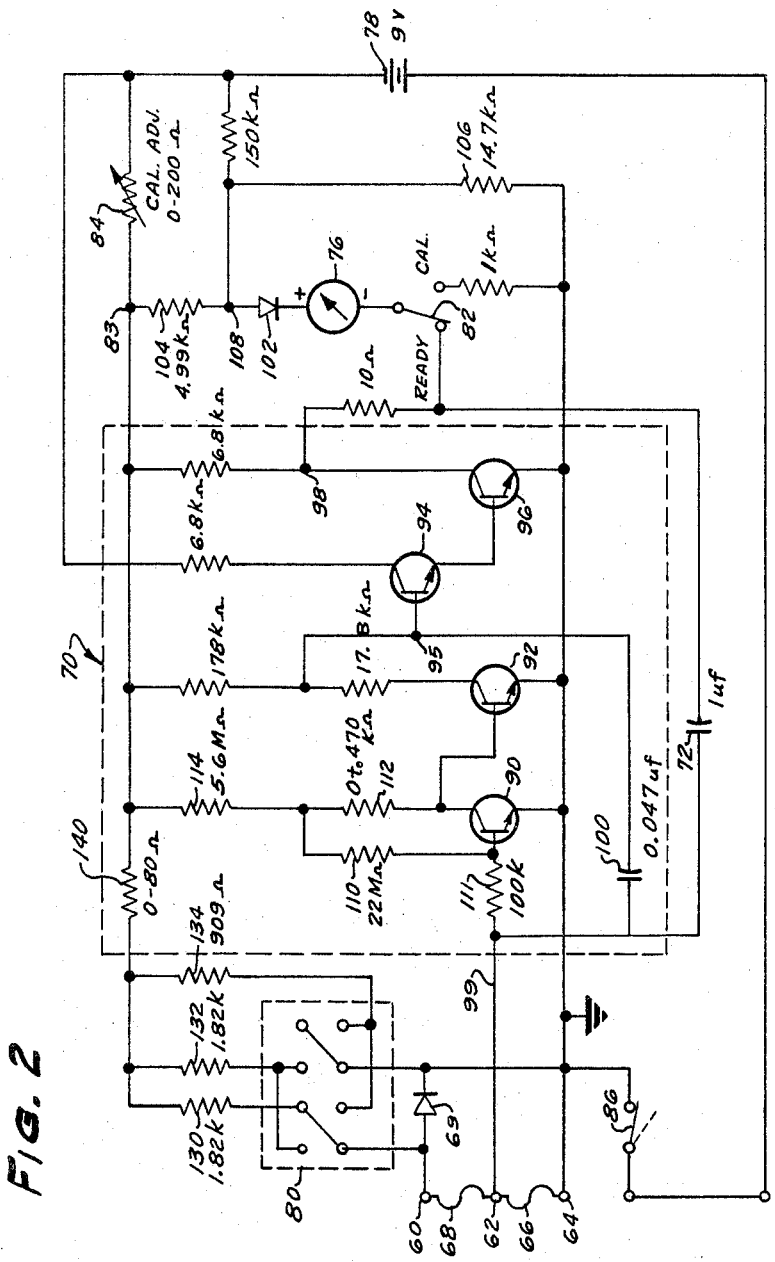
FIGURE 2 is a detailed circuit diagram of a velocity measuring instrument in accordance with the invention.

Reference is now made to FIGURE 1 which illustrates a velocity measuring instrument constructed in accordance with the invention with the circuitry presented in a simplified form to enable the easier understanding of its operation. A platform 10 is placed immediately in front of the muzzle of a gun 12 whose bullet muzzle velocity is to be measured. Four posts 14 fixed to the platform support two wires: a forward wire 16 disposed immediately in front of the muzzle and a rearward wire 18 placed one foot further from the muzzle than the forward wire. The ends of the wires 16 and 18 are connected between three input ports 20, 22 and 24 of a speed indicating circuit, in the manner shown.

Before the gun 12 in FIGURE 1 is fired, a timing capacitor 26 is charged by virtue of one side 28 being connected to ground through the forward wire 16, and the other side 30 of the capacitor being connected to a voltage source through resistors 32 and 34. An amplifier 36 connected across the capacitor 26 is maintained off until at least 0.3 volt is supplied to its input. The amplifier input is initially grounded through forward wire 16, and therefore, the amplifier neither supplies nor drains current from the capacitor 26.

When the gun 12 is fired, the bullet first breaks the forward wire 16, thereby disconnecting input 22 from ground and enabling it to rise to about 0.3 volt and turn on the amplifier 36. The voltage at input 22 does not rise above approximately 0.4 volt because the amplifier input circuit together with discharging current through the capacitor 26 drain away whatever current is necessary to prevent the voltage from rising higher. Thus, virtually all current flowing through wire 18 flows through the capacitor. Current flowing through resistor 42 and rearward wire 18 discharges the capacitor 26.

After perhaps a millisecond following the firing of the gun, the bullet breaks the second wire 18, and the capacitor ceases to discharge. Current flows from a voltage source 46 through a meter 44, and through the amplifier output to ground. The amount of current flowing through the meter is proportional to the charge on the capacitor, which is proportional to the time during which it discharged, which time is the perhaps one millisecond period between breaking of the wire 16 and the wire 18.

The meter current is maintained by the amplifier, by virtue of the amplifier input current which can flow only through capacitor 26. For an extremely large amplifier gain, the current through the capacitor is negligible. Thus, the capacitor does not discharge and the current through the meter 44 remains constant. The dial of the meter is calibrated in velocity increments instead of volts or amperes, so that the velocity of the bullet can be read directly therefrom.

In order to assure accuracy, the voltage supply must be maintained close to a particular level. The instrument is typically energized by a battery 46 which varies in voltage. A variable resistor 34 is provided to adjust the voltage. In order to calibrate the instrument, a switch 50 is positioned to connect one input of the meter 44 to ground. The resistor 34 is adjusted until the meter points at a calibration marking on its dial.

Maintenance of a constant voltage at the side of the variable resistor 34 opposite the battery 46 requires that a fairly constant current flow through the resistor 34, which requires that a fairly constant current flow through resistor 42. To assure constancy, a diode 52 is provided which becomes conducting at approximately 0.7 volt. Thus, when the rearward wire 18 is broken, and current cannot flow through the input of amplifier 36, approximately the same current flows through the diode 52 as before the wire 18 was broken.

FIGURE 2 illustrates a detailed circuit diagram of an actual velocity meter used for timing the speed of projectiles in the range of 500 to 5000 feet per second. The circuit comprises three input terminals 60, 62 and 64, a forward breakwire 66 connected between terminals 62 and 64, and a rearward breakwire 68 connected between terminals 60 and 62. The breakwires are typically mounted in the manner shown in FIGURE 1. The input terminal 62 is connected to the input of a multistage amplifier 70. A capacitor 72 which partially discharges during transit of a bullet between the two breakwires, is connected across the amplifier. An ammeter 76 with a full range deflection of one milliampere is connected to one terminal of the capacitor, the meter serving to indicate capacitor charge and therefore speed of a bullet. A nine volt battery 78 supplies current for operation of the instrument.

The instrument has four external switches. A range switch 80 enables the connection of one of three resistances to the capacitor 72 during its brief discharging period, to provide velocity readings in any one of three ranges. A calibration switch 82 enables the connecting of the meter 76 to ground, to determine whether the voltage supplied by the voltage source 78 is too high or low. A calibration adjustment knob of a variable resistor 84 enables the voltage energizing the circuit to be adjusted until it is of the correct value, as can be determined from the meter 76 when it is used to calibrate. An on-off switch 86 connects the battery 78 to the circuit when the instrument is to be used.

A complete understanding of the functioning of the circuit of FIGURE 2 in measuring velocity can be had by considering its operation during three distinct periods. These three periods comprise a first period prior to a bullet breaking the front wire 66, a second period between a bullet breaking the wire 66 and wire 68, and a third period after the wire 68 is broken. It is assumed that the on-off switch 86 is on and the calibration switch 82 is on "ready" during all three periods. For the circuit shown, a voltage of 7 volts at point 83 has been found adequate to enable operation of the circuit and yet allow the battery 78 to provide a long period of service.

During the first period, the wires 66 and 68 are intact. Accordingly, input terminals 60, 62 and 64 are at ground potential, and the input 88 to amplifier 70 is at ground potential. The amplifier uses four transistors 90, 92, 94, and 96, all silicon transistors such as type GE2N3396, and having a threshold base input of approximately 0.3 volt, that is, the base to emitter voltage must be at least about 0.3 volt before the transistor conducts current of the order of magnitude of microampere (and about 0.6 volt for conduction of currents measured in milliamperes).

With resistors 114, 110, and 111 of values 5.6 megohms, 22 megohms and 100,000 ohms, as illustrated in the figure, the base voltage is much less than 0.3 volt and transistor 90 is off, or, i.e., does not conduct between its collector and emitter. The base of transistor 92 rises to approximately one-half volt so that the transistor is on and in a saturated state whereby the collector to emitter resistance is very low. With transistor 92 on, the voltage at the base 95 of transistor 94 is approximately 0.8 volt. The 0.8 voltage at the base of transistor 94 is insufficient to turn on both transistor 94 and 96 so that they will conduct in the milliampere range, and transistors 94 and 96 conduct very little current.

Inasmuch as transistor 96 conducts very little current, its collector, point 98 is maintained at 7 volts and the timing capacitor 72 is charged to 7 volts.

The second period begins when a bullet breaks the forward wire 66 and ends when the bullet breaks the rearward wire 68. When the wire 66 is broken the input 62 is no longer at ground potential, but rises until it reaches approximately 0.3 volt, at which point current flows through the base of transistor 90. As was earlier noted, the base of transistor 94 was at potential of 0.8 volt prior to breaking wire 66, and therefore, capacitor 100 was charged to 0.8 volt. When input 62 rises by 0.3 volt, capacitor 100 transfers this rise to point 95 so that the base of transistor 94 rises to approximately 1.1 volts. This voltage is enough to make transistors 94 and 96 conduct currents of the order of milliamperes in a linear range. Reinforcing the rise in potential of the base 95 of transistor 96 is the fact that when transistor 90 begins to conduct, the base voltage of transistor 92 falls and it conducts in a linear region instead of at saturation. Accordingly, the collector voltage of transistor 94 rises.

When transistor 96 begins to conduct, the voltage at point 98, which is essentially one side of the capacitor 72, begins to fall and the capacitor 72 begins to discharge.

When the capacitor voltage at point 98 falls to about 4.7 volts, a diode 102 connected to the meter starts to conduct. This is, of course, due to voltage divider resistors 104 and 106 which provide 5.5 volts at point 108. (An additional 0.9 volt is required for the diode to begin conducting, since the voltage across the diode is approximately 0.8 volt.) Current through the meter could flow into the capacitor 72 and cause inaccuracies, but the amplifier provided by transistor 94 and 96 prevent this, and all but a small fraction of meter current flows through transistor 96 to ground.

The capacitor 100 serves as a bypass connection around transistors 90 and 92 for transient currents. Accordingly, during the brief period of perhaps a millisecond between breaking of the wires 66 and 68, the capacitor 72 is effectively connected across an amplifier consisting of only transistors 94 and 96. These two transistors provide an amplification of approximately 10,000. By bypassing transistors 90 and 92, any phase shifts they might add is prevented, and there is little danger that disruptive oscillations will occur.

The amplifier provided by transistors 94 and 96 maintains a nearly constant input voltage of approximately 0.3 volt, since any input above that threshold level results in a large output which, through negative feedback, brings the input back to 0.3 volt. The fixed input voltage results in a constant and definite current flow from the 7 volt point 83 through the wire 99 and into the capacitor to discharge it. Thus, the capacitor discharges in an extremely linear manner. With a high amplification such as 10,000, the amplifier input draws only one ten-thousandth of the current flowing through the capacitor, and the capacitor discharge rate is accurately known.

It may be noted that the point 95 to which the bypass capacitor 100 is connected is both the output of transistor 92 and the input to transistor 94. Thus, the capacitor 100 serves not only to couple input currents directly to transistor 94 but also serves to lower the gain of the amplifier section composed of transistors 90 and 92. The lower gain is due to the fact that a capacitor connected across an amplifier provides large feedback at high frequencies and thus lowers the amplifier gain at high frequencies.

The third period begins when the bullet breaks th rearward wire 68. The voltage at the input terminal 60 rises to 0.7 volt, at which point a silicon diode 69 conducts in the forward direction in the milliampere range and all current flowing through the switch 80 flows to ground.

Upon breaking the wire 68, the only base current in the transistor 90 is that provided through the large resistor 110, of about 22 megohms. This current is just sufficient to keep the transistor 90 in the linear region, and this current flows through the base of the transistor 90. All of the transistors remain in a linear region of operation. Current cannot flow through the base of the transistor 90 to discharge the capacitor 72 since this would turn off the transistor 90. The by-pass capacitor 100 has no effect once nearly steady-state conditions are established, which conditions are realized rather rapidly. Accordingly, the capacitor 72 is functionally connected across an amplifier, comprising the transistors 90, 92, 94, and 96, which exhibits a gain of approximately $5 \times 10^7$.

When the velocity instrument is used in a range appropriate to the projectile speed being measured, the voltage of capacitor 72 will have decreased to less than 4.7 volts. Accordingly, the meter diode 102 will conduct and current will flow through the meter to point 98 and through the transistor 96 to ground. The amount of current flowing through the meter 76 is proportional to the difference between 4.7 volts and the voltage on the capacitor. This difference is proportional to the time between the breaking of the first wire 66 and of the second wire 68, which is, in turn, inversely proportional to the speed of the projectile. The dial of the meter is marked in feet per second, and thus yields a direct indication of projectile speed.

If the meter current, or perhaps one-half milliampere, were to flow directly through the capacitor, the capacitor voltage would decrease substantially in a fraction of a second and a person would not have sufficient time to read the meter, even if the meter needle moved fast enough. However, the fact that the capacitor is connected across an operational amplifier results in only a very small current flowing through the capacitor. For the four transistor amplifiers described herein, one part in $5 \times 10^7$ of meter current flows through the capacitor 72, which essentially has no effect.

Some drift in meter reading does occur due to the fact that resistor 110 does not supply the precise current necessary to just keep transistor 90 in the linear range, and some capacitor current flows through the transistor base. A resistor 112 of proper resistance, typically between 0 and 470 kilohms, will provide a base current of proper value and hold drift to a minimum. The resistors 110 or 114 or the transistor 90 could be altered to make base current approximately equal to what is required, but an additional resistor 112 is easier to provide in mass production manufacturing. It has been found that drift is easily kept so low that the meter velocity reading will remain constant for more than 30 seconds, which is ample time for almost all purposes.

The velocity meter of FIG. 2 is designed for operation in any one of three ranges: 500 to 1250 feet per second, 1000 to 2500 feet per second, and 2000 to 5000 feet per second. The different ranges are established by providing three different resistances by means of the switch 80. If the switch 80 is in too low a range, the capacitor will have discharged very little and inaccurate results would be obtained. The voltage divider comprising resistors 104 and 106 prevent any reading unless appreciable discharge of the capacitor has occurred, so that the capacitor voltage is less than 4.7 volts, thereby assuring accurate results.

The three speed ranges of operation are obtained by switch 80, which interconnects eight terminals 121, 122, 123, 124, 125, 126, 127, and 128, to connect either of three resistances to the capacitor 72 when it is discharging. FIG. 3 shows one connection appropriate for projectile velocities of 2000 to 5000 feet per second for one foot separation of wire, inasmuch as the three resistors 130, 132, and 134 are then connected in parallel so that the capacitor quickly discharges through only 455 ohms. FIG. 4 shows a second connection appropriate for providing an equivalent resistance of 910 ohms, and velocities of 1000 to 2500 feet per second. FIG. 5 shows a third connection providing a resistance of 1.82K ohms, and is appropriate for velocities of 400 to 1250 feet per second.

It is an important feature of the switch arrangement of FIGS. 3, 4, and 5 that the total current passing through the switch is the same no matter what range the switch is set for. This is important because if different currents were to flow, then the voltage drop across the calibration adjustment resistor 84 would vary and the instrument would have to be recalibrated each time the range was changed. Failure to recalibrate would lead to significant errors. It should also be noted that about the same current flows through the switch 80 before and after the break wires are cut, because the current which flowed through the break wire, instead flows through the diode 69, when wire 68 is cut. Thus, the voltage at point 83 varies only slightly during operation of the instrument.

Prior to the use of the instrument, it is usually desirable to adjust the resistor 84 to set the voltage at point 83 at the proper level. This is required where electric cells of the type which vary considerably in voltage with age, are used. The calibration is performed by placing the calibrate switch 82 in the "cal." position. The current through the meter is proportioned to voltage at point 83, and resistor 84 is adjusted until the indicated current pivots the meter needle to a calibration marking on the meter dial, this marking preferably located near full scale deflection of the meter needle. Of course other means for assuring constant voltage, such as a Zener diode, can be used, but they generally result in appreciably greater expense.

In the manufacture of velocity measuring instruments, it is found that additional components can be added to enable the use of less critical components. For example, the resistor 112 is used because it is difficult to obtain transistors with the precise base characteristics. Another example is the use of an additional resistor 140 in series with the resistors 130, 132 and 134, to compensate for deviation in capacity of available capacitor 72 from the desired capacitance. Stable capacitors are available, but their capacities cannot be specified with too great precision if they are to be obtained at reasonable cost. The resistor 140 is chosen to compensate for the capacitance and it usually is of a value of up to 80 ohms.

The construction of break wires 66 and 68 is sometimes important in preventing premature breakage by the nozzle blast rather than by the projectile. To prevent such breakage where the forward wire is close to the muzzle, a soft wire of large specific gravity is found appropriate. The large specific gravity provides a high inertia to resist movement, yet provides only a small area to receive the force of the blast. Wires of lead or its alloys such as the lead and tin combinations used in soldering have been found satisfactory.

While a particular embodiment of the invention has been described in detail herein, obviously many modifications thereof may be resorted to by those skilled in the art and the scope of the invention is limited only by a just interpretation of the following claims.

What is claimed is:
1. A time measuring circuit comprising:
a high gain amplifier;
a capacitance having a first side connected to the input of said amplifier and a second side connected to the output of said amplifier;
voltage source means for enabling the charging of said capacitance;
first conductor means for connecting said second side of said capacitance to one potential of said voltage source means;
severable second conductor means for connecting said first side of said capacitance to another potential of said voltage source means to prevent a change of charge on said capacitance until the severance of said second conductor means;
a resistance;
severable third conductor means for connecting together said first and second sides of said capacitance through said resistance, at least when said second conductor means is open to terminate a change of charge on said capacitance upon the severing of said third conductor means;
high resistance means connected between said amplifier and said voltage source means for carrying current to power said amplifier at least when both said second and third conductor means are open; and
indicating means responsive to the charge of said capacitance for indicating a quantity dependent upon the time period between the opening of said second and third conductor means.

2. A timing circuit as defined in claim 1 wherein:
said high gain amplifier comprises at least two amplifier stages, and including high frequency bypass means connected between the input and output of at least one of said stages, whereby to reduce the number of stages of amplification during timing periods to reduce the possibility of positive feedback.

3. A timing circuit as defined in claim 1 wherein:
the input to said amplifier comprises the base of a transistor with a collector to emitter resistance of at least hundreds of kilohms, to enable operation of said amplifier with threshold first stage input voltage required for operation of the order of magnitude of 0.3 volt and including
a diode connected between said second conductor means and said another potential, said diode having a threshold forward voltage of slightly more than said threshold first stage input voltage, whereby to enable conduction of current through said diode only when the connection of said third conductor to said amplifier input is broken.

4. A timing circuit as defined in claim 1 wherein:
said indicating means comprises an ammeter type movement having first and second terminals, and including
means connecting a first side of said ammeter-type movement to a predetermined first potential of said voltage source means;
calibration switch means for selectively connecting said second terminal of said ammeter-type movement to said second terminal of said capacitance and a second predetermined potential of said voltage source to test for proper source voltage;
means for varying the voltage in at least a portion of said voltage source means for varying the voltage to which said capacitance is charged;
means selectively connecting said variable resistance means to said voltage source means and said capacitance; and
a calibration marking on the dial of said ammeter-type movement for indicating that a proper voltage is being supplied to said capacitance.

5. A timing circuit as defined in claim 1 wherein:
said indicating means comprises an ammeter-type movement and including
means connecting a first side of said meter to one side of said capacitance; and
resistance means connected between said voltage source and a second side of said movement opposite said capacitance, to provide voltage at said second side of said meter substantially lower than the highest voltage to which said capacitance is charged, whereby to prevent any forward meter indications if the period of time during which said capacitance discharges is very brief.

6. A timing circuit as defined in claim 1 including:
a plurality of resistances;
range changing switch means connected between said voltage source and said capacitance, having a plurality of positions for connecting any of said plurality of resistances between said second conductor means and the second side of said capacitance, to change the discharging rate of said capacitance, wherein the resistance in series with said switch between said voltage source and ground is constant for any of said plurality of positions of said switch when said first and second conductor means are intact.

7. A timing circuit as defined in claim 1 wherein:
said high gain amplifier comprises at least two amplifier stages wherein the output of a first of said stages is the input to a second of said stages and including
capacitor means connected between the input to said first stage and the same input to said second stage to which the output of said first stage is connected, whereby to simultaneously reduce the high frequency gain of said first stage and to bypass high frequency inputs from the input of said first stage to said input of said second stage.

References Cited

UNITED STATES PATENTS

| | | | |
|---|---|---|---|
| 2,269,603 | 1/1942 | Rockwood | 324—68 |
| 2,301,192 | 11/1942 | Bradford | 324—70 |
| 2,377,757 | 6/1945 | Clark | 324—68 |
| 2,502,450 | 4/1950 | Gittings | 324—68 |
| 2,699,529 | 1/1955 | Wenk | 324—70 |
| 2,743,417 | 4/1956 | Hollman | 324—70 |

RUDOLPH V. ROLINEC, *Primary Examiner.*

WALTER L. CARLSON, *Examiner.*

M. J. LYNCH, *Assistant Examiner.*